United States Patent
Bringe

(10) Patent No.: US 10,952,457 B2
(45) Date of Patent: Mar. 23, 2021

(54) TASTE CHARACTERISTICS IN SOY-BASED FOOD PRODUCTS USING HIGH-PROTEIN SOYBEANS

(71) Applicant: WhiteWave Services, Inc., Denver, CO (US)

(72) Inventor: Neal Allan Bringe, Elizabeth, CO (US)

(73) Assignee: WhiteWave Services, Inc., Denver, CO (US)

( * ) Notice: Subject to any disclaimer, the term of this patent is extended or adjusted under 35 U.S.C. 154(b) by 1044 days.

(21) Appl. No.: 14/942,480

(22) Filed: Nov. 16, 2015

(65) Prior Publication Data

US 2017/0135379 A1    May 18, 2017

(51) Int. Cl.
| | | |
|---|---|---|
| *A23L 11/30* | (2016.01) | |
| *A23L 11/00* | (2021.01) | |
| *A23C 11/10* | (2021.01) | |
| *A23J 3/16* | (2006.01) | |

(52) U.S. Cl.
CPC ............ *A23L 11/31* (2016.08); *A23C 11/103* (2013.01); *A23C 11/106* (2013.01); *A23J 3/16* (2013.01); *A23L 11/07* (2016.08); *A23V 2002/00* (2013.01)

(58) Field of Classification Search
None
See application file for complete search history.

(56) References Cited

U.S. PATENT DOCUMENTS

| | | | | |
|---|---|---|---|---|
| 4,209,541 A | * | 6/1980 | Clatfelter | A23L 11/07 426/430 |
| 4,409,256 A | * | 10/1983 | Johnson | A23L 11/31 426/471 |
| 4,678,673 A | * | 7/1987 | Marshall | A23C 20/025 426/36 |
| 4,906,482 A | * | 3/1990 | Zemel | A23C 11/103 426/598 |
| 7,704,540 B2 | | 4/2010 | Bringe et al. | |
| 8,940,353 B2 | | 1/2015 | Bringe et al. | |
| 2004/0197463 A1 | * | 10/2004 | Gottemoller | A23C 11/06 426/629 |
| 2006/0062890 A1 | * | 3/2006 | Delgado Araujo | A23L 11/33 426/634 |
| 2008/0008815 A1 | | 1/2008 | Cho | |
| 2012/0023111 A1 | | 9/2012 | Matsuura | |
| 2013/0078363 A1 | | 3/2013 | Samoto et al. | |

OTHER PUBLICATIONS

Fao: Technology of Production of Edible Floursand Protein Products From Soybeans . . . ; by Agriculture and Consumer Protection of the FAO Corporate Document Repository; published online at least by Oct. 1, 2014 at: https://web.archive.org/web/20141001201157/http://www.fao.org/docrep/t0532e/t0532e04.htm.*

(Continued)

*Primary Examiner* — Patricia A George
(74) *Attorney, Agent, or Firm* — Baker Botts L.L.P.

(57) ABSTRACT

In one embodiment, a method comprises adding a plurality of soybeans to an extractor, the soybeans having an average protein:oil ratio of greater than 2.3, heating the soybeans, removing hulls from the plurality of soybeans, and grinding the plurality of soybeans with water at a temperature between 180° F. and 190° F. to yield a soy extract having hexanal levels of less than 50 parts per billion (ppb).

10 Claims, 2 Drawing Sheets

(56) References Cited

OTHER PUBLICATIONS

Hwang: A genome-wide association study of seed protein and oil content in soybean; BMC Genomics 2014, 15:1; published online at least by Nov. 8, 2014 at: https://web.archive.org/web/20141108085836/ http://www.biomedcentral.com/1471-2164/15/1.*
Cornell: Cereals: Agriculture-Food processing—Oil crops—Soybean—Philippines; Cornell Univ. Dept.of Food Science and Technology; published 1969.*
Zhang: Off-Flavor Related Volatiles in Soymilk As Affected by Soybean Variety, Grinding, and Heat-Processing Methods; dx.doi.org/10.1021/jf3016199 | J. Agric. Food Chem. 2012, 60, 7457-7462.*
ENV: Environment Directorate Joint Meeting; Series on the Safety ; Aug. 2, 2012 (Year: 2012).*
EPO Communication, Application No. 16195745.1-1358; 10 pages; dated Dec. 16, 2016.
Mizutani T. Hashimoto H: "Effect of grinding temperature on hydroperoxide and off-flavor contents during soymilk manufacture process", J. Food Sci., vol. 69, No. 3, Mar. 18, 2004 pp. SNQ12-SNQ16, XP55322930, p. SNQ113, p. SNQ115, figure 2a.
Shaohong Yuan, et al., "Selected Odor Compounds in Soymilk as Affected by Chemical Composition and Lipoxygenases in Five Soybeam Materials", Journal of Agricultural and Food Chemistry, vol. 55, No. 2, Jan. 1, 2007, pp. 426-431, XP055322928 US; ISSN: 0021-8561, DOI: 10.1021/jf062274x abstract pp. 427-428 table 4.
S. H. Yuan et al., "Selected Odor Compounds in Cooked Soymilk as Affected by Soybean Materials and Direct Steam Injection," vol. 72, Nr. 7, 2007, Journal of Food Science, Copyright 2007 Institute of Food Technologists, pp. S481-S486.
Lei Ma et al., "Evaluation of the chemical quality traits of soybean seeds, as related to sensory attributes of soymilk," Food Chemistry 173 (2015) 694-701.
Shi Xiaodi et al., "Flavor characteristic analysis of soymilk prepared by different soybean cultivars and establishment of evaluation method of soybean cultivars suitable for soymilk processing," Food Chemistry 185 (2015) 422-429, Copyright 2015 Elsevier Ltd.
MX Office Action received for Patent Application No. MX/a/2016/014322 dated Mar. 5, 2020.

* cited by examiner

TASTE CHARACTERISTICS IN SOY-BASED FOOD PRODUCTS USING HIGH-PROTEIN SOYBEANS

TECHNICAL FIELD OF THE DISCLOSURE

This invention relates in general to soy-based food products and, more particularly, to improving the taste characteristics of soy-based food products through the use of soybeans with high protein:oil ratios.

BACKGROUND

Soy-based food products (e.g., soymilk) may have beany and/or cereal-like taste characteristics that may be unfavorable to consumers. These taste characteristics may be the result of lipid oxidation during processing, packaging, and/or storage of the products. One indicator of lipid oxidation may include hexanal levels in the soy extract used to create the soy-based food products. Past methods of reducing hexanal levels have focused on methods such as the use of Ultra High Temperature (UHT) pasteurization for a few seconds followed by vacuum cooling. However, these methods have produced limited results in lowering hexanal levels in soy-based food products.

SUMMARY

In one embodiment, a method comprises adding a plurality of soybeans to an extractor, the soybeans having an average protein:oil ratio of greater than 2.3, heating the soybeans, removing hulls from the plurality of soybeans, and grinding the plurality of soybeans with water at a temperature between 180° F. and 190° F. to yield a soy extract having hexanal levels of less than 50 parts per billion (ppb).

In another embodiment, a composition is made by the method comprising adding a plurality of soybeans to an extractor, the soybeans having an average protein:oil ratio of greater than 2.3, heating the soybeans, removing hulls from the plurality of soybeans, and grinding the plurality of soybeans with water at a temperature between 180° F. and 190° F. to yield a soy extract having hexanal levels of less than 50 ppb.

In another embodiment, a composition having hexanal levels of less than 50 ppb comprises a soy extract having a protein:oil ratio of greater than 2.3, the soy extract comprising between 30% and 90% of the composition, one or more ingredients selected from the group consisting of stabilizers, vitamins, minerals, flavors, functional ingredients, salts, antioxidants, sugar, the one or more ingredients comprising between 0.4% and 7% of the composition, and water comprising the balance of the composition.

Certain embodiments of the present disclosure may provide one or more technical advantages. As an example, in some embodiments, certain taste characteristics of soy-based food products may be enhanced. As another example, in some embodiments, certain odors of soy-based food products may be reduced. Other technical advantages of the present disclosure will be readily apparent to one skilled in the art from the following figures, descriptions, and claims. Moreover, while specific advantages have been enumerated, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION

Figure 1:
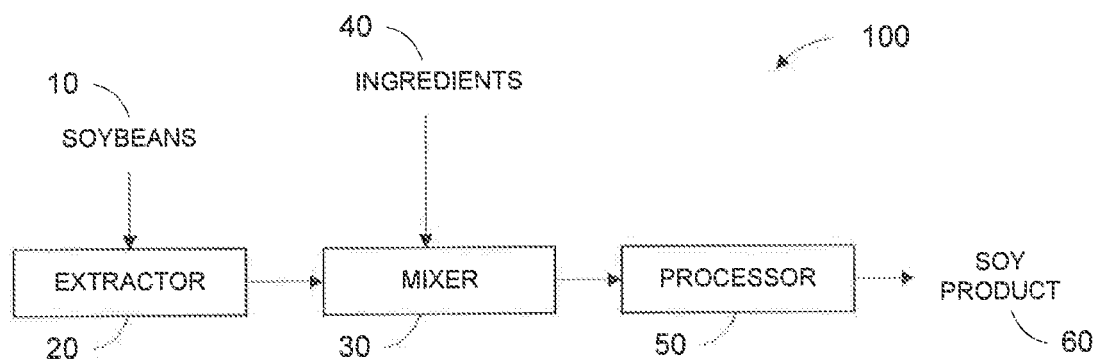
FIG. 1 illustrates an example of a system for processing soybeans to yield a soy product in accordance with embodiments of the present disclosure.

Soy-based food products, such as soymilk, may aim to have a flavor that is close to similar food products made from cow's milk. However, these soy-based food products may have beany and/or cereal-like taste characteristics that may be unfavorable when compared with that of products made from cow's milk. These taste characteristics may be the result of high lipid oxidation during processing, packaging, and/or storage, and one indicator of lipid oxidation includes the level of hexanal in the product. There is limited information on the contribution of the constituent soybeans, other than lipoxygenase enzymes to the hexanal levels in the resulting soy extract. For example, previous methods have involved the use of direct steam injection ultra high temperature (UHT) treatment to food products. However, with such methods, off-flavors may still persist and may be variable depending on the raw materials. Accordingly, aspects of the present disclosure may lower the level of hexanal in the soy extract and the resulting soy-based food product to yield more favorable taste profiles.

In particular, aspects of the present disclosure may use soybeans and/or soy chips having a higher protein:oil ratio in order to create improved soy extract compositions and soy-based food products with improved taste characteristics. Higher overall protein:oil ratio soybeans and soy chips may create more favorable taste characteristics in soy-based food products due to the correlation of the higher protein:oil ratios with lower hexanal levels in the resulting soy extract, and the correlation of lower hexanal levels in soy extract with lower levels of a grain/cereal taste characteristic in the resulting food product (as described further below). As a result of using soybeans and soy chips with higher protein:oil ratios to make soy extract with improved composition, soy-based food products may be created that have similar levels of protein as current soy-based food products, but with more favorable taste characteristics. Alternatively, using soybeans and soy chips with higher protein:oil ratios may allow for soy-based food products having higher levels of protein than current soy-based food products, but with similar taste characteristics since the amount of soy extract used in creating the food product may be greater than that used in current soy-based food products (which is currently limited due to its negative effects on taste characteristics; i.e., more soy extract in the product typically leads to higher levels of beany or grain/cereal taste characteristics).

Soybeans having higher protein:oil ratios (high protein soybeans) as compared to typical or conventional soybeans may be used to create soy extract with improved composition in particular embodiments. For example, in particular embodiments, high-protein soybeans may be mixed with conventional soybeans to yield a soy extract mixture having a higher overall protein:oil ratio. Conventional soybeans with their oil extruded (i.e., to raise the protein:oil ratio), do not lead to the same hexanal-lowering effects of soy extract created with high-protein soybeans.

Figure 3:
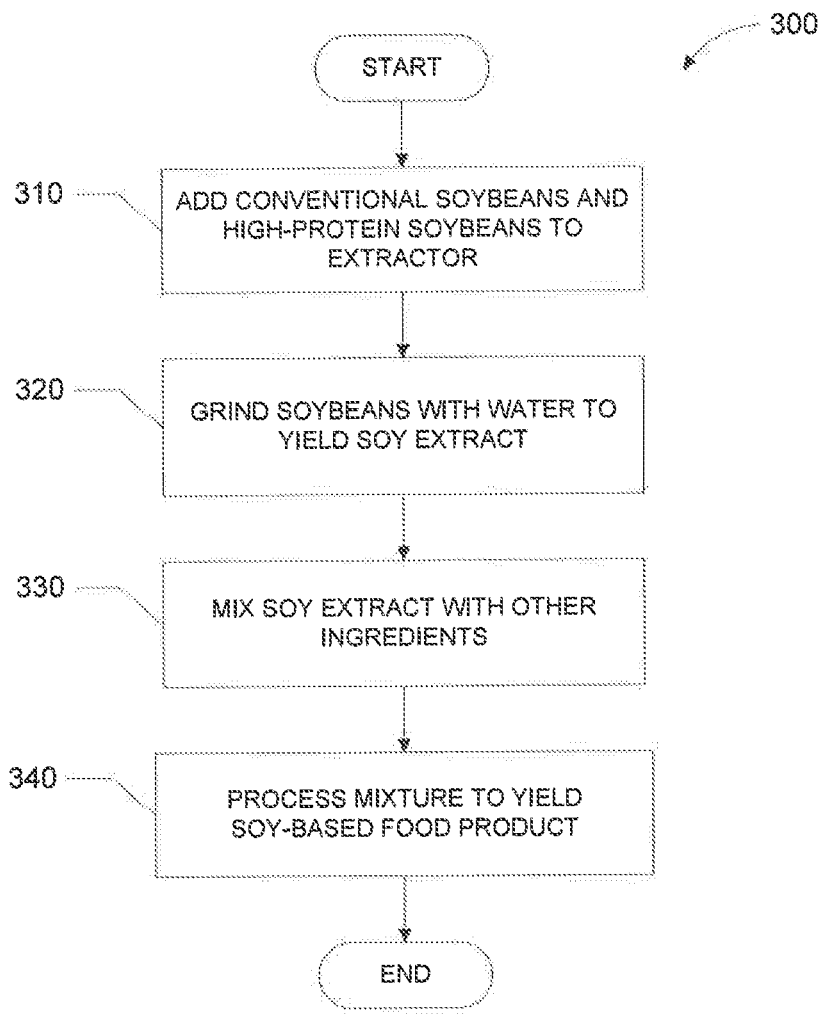
FIG. 3 illustrates an example method for producing soy-based food products with improved taste characteristics in accordance with embodiments of the present disclosure.

Embodiments of the present invention and its advantages are best understood by referring to FIGS. 1-3 of the drawings, like numerals being used for like and corresponding parts of the various drawings.

FIG. 1 illustrates an example system 100 for processing soybeans 10 to yield a soy product 60 with lower hexanal levels. Soy product 60 may comprise a flavored or non-flavored soymilk beverage in certain embodiments. However, soy product 60 may include any soy-based food product capable of being produced by system 100 or similar systems, including but not limited to fermented soy products such as soy yogurt.

System 100 may include an extractor 20, a mixer 30, and a processor 50. To create soy product 60, a plurality of soybeans 10 are first be placed into extractor 20, which may generate an aqueous soy extract from soybeans. For example, extractor 20 may receive soybeans 10 and may dry and remove the hulls therefrom. The de-hulled soybeans 10 (also referred to as soy chips) may be ground with hot water (e.g., between 180° F. and 190° F.), and the soluble components of the soybeans 10 may be extracted to form a soy extract. In some embodiments, the suspension may be heated to remove moisture. The soy extract may have a range of fat composition that depends upon the fat composition of the constituent soybeans 10. In certain embodiments, the soybeans 10 may be de-hulled to form soy chips that are then extruded to remove oil therefrom prior to being ground to form a low-fat or light soy extract. Insoluble components of the soybeans 10 (e.g., fiber and protein components) may be separated from the suspension during the creation of the soy extract, for example, by using a decanter or other mechanical means. In certain embodiments, the suspension may be heat-processed (e.g., heated to approximately 248° F. for approximately 8 seconds, or heated to approximately 285° F. for approximately 3 seconds) and then cooled (e.g., to approximately between 108° F. and 110° F.). The soy extract may then be added to mixer 30.

In particular embodiments, soybeans 10 may have a relatively high average protein:oil ratio in order to yield a soy extract having lower hexanal levels. For example, soybeans 10 may have an average protein:oil ratio of greater than 2.3 or 2.5 to yield a soy extract having hexanal composition of less than 50 parts per billion (ppb), such as less than 30 ppb. Soybeans 10 may include a first set of soybeans having a protein:oil ratio of less than 2.3 (e.g., soybeans typically used in the creation of soy-based food products) and a second set of soybeans having a protein:oil ratio of greater than 2.5 (high-protein soybeans), which may yield a soy extract having hexanal composition of less than 50 ppb, such as less than 30 ppb. Such a soy extract may allow for improved taste characteristics (e.g., lower grain/cereal taste characteristics) due to the relatively low hexanal level. Examples of conventional (and non-GMO) soybeans contemplated by the present disclosure include PIONEER 93B82 and EMERGE 389 soybeans. An example high-protein (and also non-GMO) soybean contemplated by the present disclosure includes NATURE'S GENETICS 6108.

Mixer 30 may combine the soy extract with other ingredients 40. Mixer 30 may comprise any appropriate container suitable to receive, mix, and/or discharge one or more ingredients 40. In particular embodiments, mixer 30 may comprise a stainless steel chamber of any suitable size. For example, mixer 30 may be sized to mix the soy extract and ingredients 40 in large batches that may later be divided into smaller sizes suitable for sales to consumers, or mixer 30 may be sized to mix smaller, individual-sized portions.

Mixer 30 may receive the soy extract and the ingredients 40 through one or more different inlets. For example, the soy extract may be added to the mixing chamber through one or more nozzle and hose inlets, and other ingredients 40, such as sweeteners, flavors, and/or stabilizers, may be added through one or more openings in mixer 30. Mixer 30 may include one or more means for blending, mixing, combining, stirring, and/or agitating ingredients 40. For example, mixer 30 may include mechanical agitators, pressure jets, or other suitable mixing devices, whether located within mixer 30 or external to mixer 30. Alternatively, mixer 30 may allow for stirring or mixing by hand. In some embodiments, mixer 30 may be chilled (depending on the particular ingredients 40 used) to prevent microbial growth and degradation of one or more ingredients 40 during mixing and/or processing. Accordingly, mixer 30 may include a jacketed or insulated tank to maintain appropriate temperatures. Mixer 30 may also include one or more discharge outlets connected to other components of system 100. For example, mixer 30 may include one or more discharge outlets connected to hoses or tubes, which may carry an aqueous solution mixed by mixer 30 to processor 50, which may comprise one or more processing components.

Ingredients 40 represent constituent elements of soy product 60 that are deposited, mixed or combined, and discharged from mixer 30. Examples of ingredients 40 may include, but are not limited to, sweeteners, stabilizers, vitamins, minerals, flavors, extracts, salts, coloring agents, functional ingredients, and other ingredients including vegetables, ground seeds, grain flours, dairy milk or dairy milk alternatives. Sweeteners may be added to enhance the taste of the flavorings provided and/or provide overall sweetness to soy product 60. In particular embodiments, sweeteners may include one or more natural, high-intensity sweeteners, such as *Stevia*, including any compound or extract derived from the *Stevia* plant (e.g., rebiana-A, rebaudioside-A, and reb-A). In some embodiments the natural, high-intensity sweetener may be co-processed with other sweeteners. As an example, *Stevia* may be co-processed with sugar by blending, co-crystallization, plating (e.g., applying a solution of *Stevia* and water to sugar crystals and allowing the *Stevia* to dry on the surface of the sugar crystals), or other co-processing. Stabilizers may be added to mixer 30 to prevent separation or precipitation of soy product 60 once deposited in a package or container. Vitamins and minerals may be added to enhance the nutritional profile of soy product 60. Flavors may be added to enhance and/or change the taste of the resulting mixture. For example, flavors may include vanilla extract, almond extract, citrus extract, cocoa powder, strawberry or other fruit flavoring, or any other appropriate extracts, chemical compounds, or natural additives suitable to provide the described function. Salts may be added to improve taste and/or to act as buffering agents to enhance protein stability. One or more polyunsaturated fatty acids may be added to improve the nutritional profile of the soy beverage.

In some embodiments, ingredients 40 may also include one or more ingredients operable to facilitate Maillard browning reactions in the mixture, as such reactions may lead to further reduced levels of hexanal in the resulting soy product 60 as described in U.S. Pat. No. 8,940,353 (which is hereby incorporated by reference). In some embodiments, ingredients comprising reducing sugars and/or ingredients that form reducing sugars under heat treatment may be added to participate in Maillard browning reactions. Examples of ingredients comprising reducing sugars include glucose, ribose, fructose, honey, date syrup, high fructose corn syrup, malted barley, agave syrup, brown rice syrup, tapioca syrup, maple syrup, or any other suitable ingredient comprising reducing sugars may be selected for inclusion in the mixture, as they may provide higher levels of reducing sugars. In certain embodiments, the preceding ingredients may provide higher levels of reducing sugars for participating in Maillard browning reactions than cane sugar or other sweeteners. Examples of ingredients that may form reducing sugars under heat treatment include ascorbic acid or derivatives thereof (e.g. sodium ascorbate, calcium ascorbate, or potassium ascorbate). In certain embodiments, calcium carbonate and/or any other suitable ingredients may be selected to facilitate Maillard browning reactions by increasing the pH of the mixture during mixing and/or processing.

In operation, an operator of system 100 selects appropriate ingredients for the desired finished product. Once appropriate ingredients 40 are selected, an operator introduces selected ingredients 40 into mixer 30. Ingredients may be added serially (i.e., one at time), collectively (i.e., all ingredients are added substantially at once), or in a combination (i.e., certain subsets of ingredients are pre-combined, and the combination is added serially with other ingredients or ingredient combinations). After an appropriate mixing time, the mixture of soy extract and ingredients 40 may be discharged into processor 50 manually or through one or more nozzles, hoses, spigots, or other appropriate discharging outlet.

Processor 50 may comprise one or more components for further processing the mixture. As an example, in some embodiments, processor 50 may include means for pasteurizing the soy mixture to reduce the number of undesirable microorganisms and prolong shelf life. Pasteurization may refer to heating the product to a temperature (e.g., 160 to 295° F.) and holding it at the temperature for a period of time (e.g., 1 to 30 seconds) to reduce the number of viable pathogenic micro-organisms in the product. Examples of pasteurization techniques include high temperature short time pasteurization (HTST), ultra pasteurization (UP), ultra high temperature pasteurization (UHT), and high pressure pasteurization (HPP). In some embodiments, the soy mixture may be processed through a heat exchanger to pasteurize the mixture and then processed through another heat exchanger to cool the mixture. In certain embodiments, pasteurizing the mixture may include UHT pasteurization wherein the mixture is heated to a temperature between approximately 280° F. to 306° F. for a period of 1 to 10 seconds. In certain embodiments, processor 50 may include means for holding the soy mixture at a temperature that ranges from 175° F. to 195° F. for a period of 1 seconds to 20 seconds prior to pasteurizing. Such heating may allow for increased Maillard browning reactions.

As another example, processor 50 may include a homogenizer or other means for reducing particle size so that particle distribution may be maintained and mouthfeel may be improved. In certain embodiments, the mixture may be processed through a homogenizer after pasteurization. In particular embodiments, the mixture may undergo vacuum cooling to remove volatiles following pasteurization. In some embodiments, the vacuum cooling may be performed at a temperature of approximately 170° F. to 198° F. for a period of 1 to 5 seconds.

Once all processing steps are performed by processor 50, the resulting soy product 60 is discharged therefrom. In some embodiments, the product 60 may be directed from processor 50 to packaging, bottling, or filling components suitable to ready product 60 for commercial sale or use. For example, packaging components may deposit an amount of the mixture into one or more bottles, jars, cans, cartons, and/or any other appropriate container.

Modifications, additions, or omissions may be made to system 100 without departing from the scope of the invention. For example, the components of system 100 may be integrated or separated. As another example, the operations performed by system 100 may be performed by more, fewer, or other components than those illustrated in FIG. 1.

As yet another example, system 100 may further comprise components that may ferment the soy extract, using cultures, to a pH between approximately 4.4 and 4.5, which may allow for the creation of a soy yogurt food product rather than a soymilk food product. For instance, in certain embodiments, system 100 may allow for grinding de-hulled soybeans with hot water in extractor 20 at a temperature of approximately 180° F. to 190° F. for a period of approximately 1 to 2 minutes, and then processed by UHT heating at approximately 285° F. for a period of approximately 3 seconds. The mixture may be cooled and then diluted such that the mixture has approximately 4% to 6% protein solids, processed using an additional processor of system 100 by UHT heating at approximately 284° F. for a period of approximately 4 seconds, and then cooled to approximately 110° F. Cultures may then be added (e.g., via an additional mixer in system 100) to the mixture for fermentation to a pH between approximately 4.4 and 4.5.

Soy yogurt according to such a method may yield higher levels of acetylthizoline (approximately 2.48 ppb as compared to approximately 1.65 ppb in yogurt made from cow's milk), which may cause higher levels of cereal taste characteristics. However, soy yogurt according to the above method may achieve low combined hexanal and pentanal levels (e.g., less than 20 ppb or less than 10 ppb combined), which may cause the soy yogurt to have little to no grassy taste characteristics.

Figures 2A, 2B:
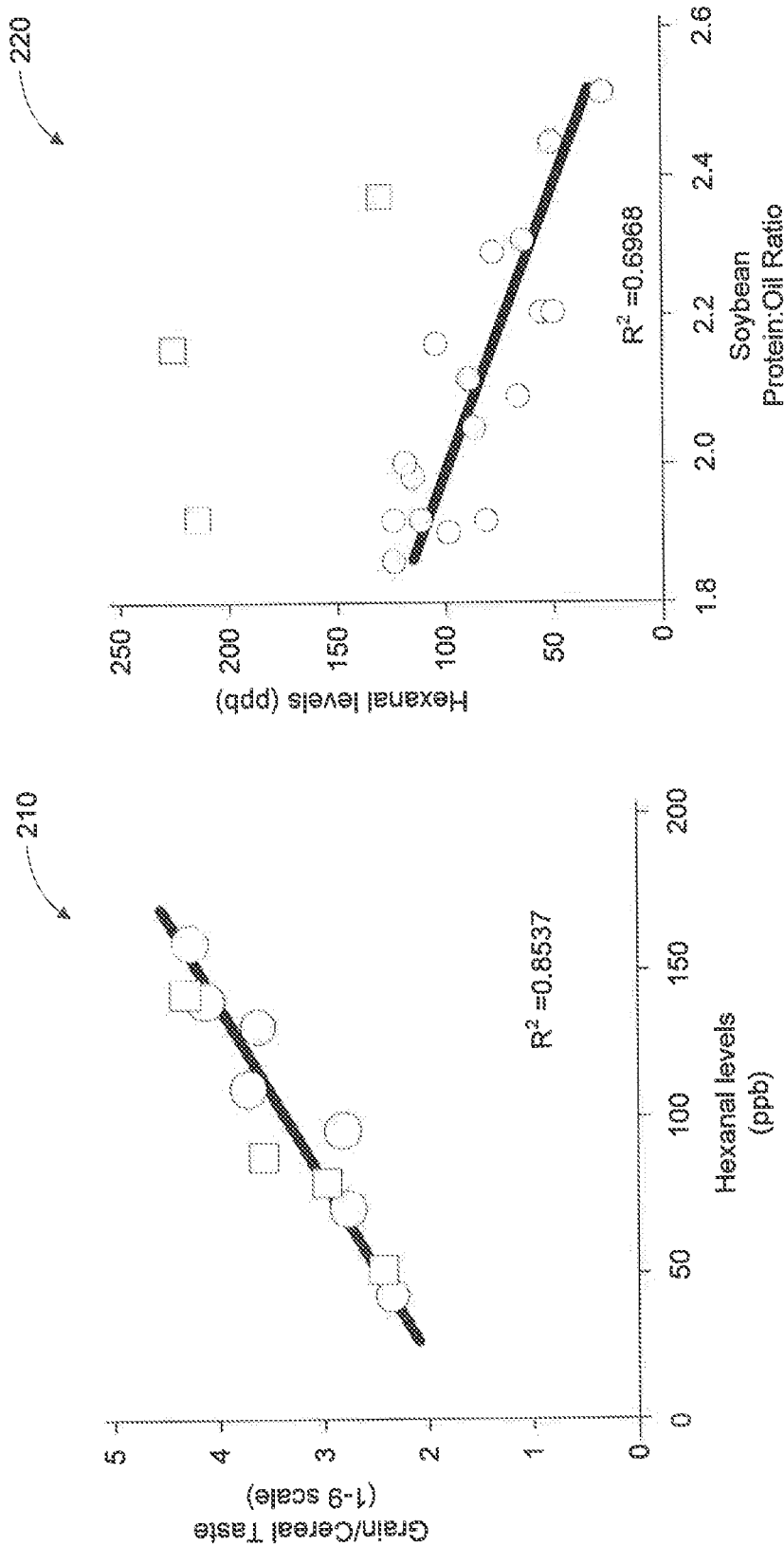
FIG. 2A illustrates a chart relating hexanal levels in soy extract with levels of a grain/cereal taste characteristic in a resulting soy-based food product.
FIG. 2B illustrates a chart relating soybean protein:oil ratios with hexanal levels in soy extract.

FIG. 2A illustrates a chart 210 relating hexanal levels in soy extract with levels of a grain/cereal taste characteristic in a resulting soy-based food product. In particular, chart 210 illustrates the direct correlated relationship between hexanal levels in soy extract and grain/cereal taste characteristics in soy products resulting from the soy extract. The points represented by circles in chart 210 indicate soy extract made from de-hulled soybeans without oil extrusion, while the points represented by squares in chart 210 indicate soy extract made from soybeans with oil extruded therefrom.

FIG. 2B illustrates a chart 220 relating soybean protein:oil ratios with hexanal levels in soy extract. In particular, chart 220 illustrates the inverse correlated relationship between protein:oil ratios of soybeans and hexanal levels in resulting soy extract, as measured from samples where protein concentration was standardized). The points represented by circles in chart 220 indicate soybeans that have a higher match to this relationship, while the points represented by squares in chart 220 indicate outlier soybeans that do not appear to closely match the relationship.

It will be observed from charts 210 and 220 that removal of oil from the soybeans by extrusion prior to forming the soy extract does not appear to have an effect on the grain/cereal taste characteristic of the resulting food product. Moreover, it will be observed that while soybeans having higher protein:oil ratios will likely yield soy extracts having lower hexanal levels, particular outlier soybeans may exist. These observations may be made because higher protein:oil ratios in soybeans may indicate genetic markers of compositions that yield lower oxidation levels in the soy extract, and thus may indicate potential for producing soy extract with lower hexanal levels. Accordingly, in certain embodiments, soy extract created using high-protein soybeans or soybean blends according to the present disclosure may be tested prior to its use in making soy-based food products.

Herein, levels of hexanal in soy extract may refer to levels of hexanal determined using a headspace test of a sample of soy extract diluted in saturated salt solution also containing a standard compound, as opposed to other known methods such as head space solid phase microextraction. In such a test, a known concentration of the standard compound (e.g., ethyl isobutyrate) is added to a homogenous slurry of a soy extract sample in a saturated salt solution. The solution is then heated to approximately 80° C. for 30 minutes to achieve thermodynamic equilibrium of the volatile components between the vapor and liquid phases. An aliquot of the vapor phase, the "headspace," is then sampled immediately with a gas-tight syringe and injected onto a gas chromatograph equipped with a flame ionization detector. A temperature gradient on the chromatographic column, from 50° C. to 220° C., yields a headspace profile of volatiles generated from the sample, from which levels of hexanal are determined. This test may be referred to as headspace Solid Phase MicroExtraction Gas Chromatography Mass Spectroscopy (SPME GC-MS).

FIG. 3 illustrates an example method 300 for producing soy-based food products with improved taste characteristics in accordance with embodiments of the present disclosure. The method begins at step 310, where soybeans are added to an extractor (e.g., soybeans 10 being added to extractor 20 in FIG. 1). The soybeans may include soybeans having relatively high average protein:oil ratios, such as ratios greater than 2.3 or 2.5. In particular embodiments, the soybeans may comprise a blend of conventional soybeans (i.e., those used in conventional soy-based food products) and high-protein soybeans. For example, the soybeans may include a first set of soybeans having an average protein:oil ratio of less than 2.3 and a second set of soybeans having an average protein:oil ratio of greater than 2.5.

At step 320, the soybeans are ground with water to yield a soy extract. The soybeans may be ground using an extractor (e.g., extractor 20 of FIG. 1). The soybeans may be de-hulled prior to or during step 320. In certain embodiments, oil from the soybeans may be extruded therefrom prior to being ground to create the soy extract, which may reduce resulting levels of fat in the resulting soy product.

At step 330, the soy extract is mixed with other ingredients. In certain embodiments, the quantity of soy extract mixed with the other ingredients may be selected to provide a desired nutritional profile based on the nutrient composition of the extract. The soy extract may comprise, for example, approximately 10 to 80% of the formula or 30 to 90% of the formula. The other ingredients including sweeteners, stabilizers, vitamins, minerals, flavors, functional ingredients, salts, antioxidants, and/or polyunsaturated fatty acids.

Sweeteners may be natural, artificial, and/or high-intensity and may function to make the products taste more appealing. Depending on their sweetening power, sweeteners may comprise approximately 0.1% to 20% of the formula. Natural, high-intensity sweeteners, such as *Stevia* or *Stevia* derivatives, may be used as a low-calorie alternative to or in combination with other sweeteners, such as other natural, high-intensity sweeteners, sugar (e.g., liquid sugar, crystallized sugar, honey, agave, cane juice, etc.), and/or artificial sweeteners (e.g., sucralose, aspartame, saccharine, etc.). In some embodiments, an amount of sugar to be combined with the natural, high-intensity sweetener may be selected to yield a selected sweetness level and selected number of calories, while minimizing metallic or bitter flavors that may be associated with the natural, high-intensity sweetener alone.

Stabilizers enhance physical properties of beverages by imparting viscosity or mouthfeel properties that may increase consumer appeal. Stabilizers may be natural or artificial and may contribute to a uniform appearance of products by stabilizing and or suspending insoluble materials and preventing separation or settling of ingredients. Examples of stabilizers may include, but are not limited to, emulsifiers, starches, gums, and various hydrocolloids such as guar, acacia, locust bean, xanthan, gellan, carrageenan, cellulose, and pectin. Approximate ranges of stabilizers may vary from 0.02 to 5% depending on desired product properties and functionality of stabilizers.

Vitamins and minerals may be added to fortify products. As an example, in some embodiments, the product may be fortified with calcium using calcium sources such as carbonate ($CaCO_3$) and/or tricalcium phosphate ($Ca_3(PO_4)_2$). The calcium source may be selected to maintain a pH level within a suitable range during processing, such as pasteurization processing. Pasteurization may refer to heating the product to a temperature (e.g., 280 to 306° F.) and holding it at the temperature for a period of time (e.g., 1 to 10 seconds) to reduce the number of viable pathogenic microorganisms in the product. The product may be pasteurized and cooled using indirect or direct heating. An example of indirect heating may include passing the product through a heated pipe. An example of direct heating may include injecting steam into the product. A vacuum flash may be applied to the steam-injected product once the pasteurization process has been completed to remove the water vapor and/or some volatile odors, and to cool the product.

Flavors and flavoring ingredients including extracts of plant materials, cocoa powder, milk based ingredients, compounded flavors, impart desired taste attributes to products. They are used at various levels depending on the strength and the desired end product attributes. Approximate ranges of flavoring ingredients may vary from 0.002 to 5% depending on desired product properties.

Functional ingredients like fiber, plant sterols, etc. may be added to soymilk formulations to enhance functionality of products.

Salts of various types may also be used to improve taste, and to act as buffering agents to enhance protein stability. Such salts include sodium citrate, sodium chloride, potassium citrate, potassium phosphate, and dipotassium phosphate.

Antioxidants may prevent and/or reduce oxidation and may preserve the flavor and appearance of the product during refrigerated and/or unrefrigerated storage. Antioxidants may reduce oxidation by trapping free radicals in the product. Other examples of antioxidants may include melanoidins, BHA, BHT, propyl gallate, and tocopherols.

Polyunsaturated fatty acids (PUFAs) refer to a family of fatty acids that naturally occur in certain fish, leafy green vegetables, and vegetable oils. Polyunsaturated fatty acids can include a carbon chain comprising eighteen or more carbon atoms and two or more double bonds. Examples of polyunsaturated fatty acids include omega fatty acids, such as omega-3 fatty acids (e.g., docosahexaenoic acid (DHA), docosapentaenoic acid (n-3) (DPAn-3), stearidonic acid (SDA), linolenic acid (LNA), and alpha linoleic acid (ALA), and eicosapentaenoic acid (EPA)), and omega-6 fatty acids (e.g., arachidonic acid (ARA), docosapentaenoic acid (n-6) (DPAn-6), linoleic acid (LA), gamma linolenic acid (GLA), and dihomo gamma linolenic acid (n-6)). Examples of ingredients containing PUFAs include flax seed and derivatives thereof (e.g. flax seed oil, whole ground flax seed, ground chia seed) and genetically modified soybeans or canola.

The other ingredients may also include certain ingredients that are operable to facilitate Maillard browning reactions such as ingredients comprising reducing sugars and/or ingredients that form reducing sugars under heat treatment. Examples of ingredients comprising reducing sugars include glucose, ribose, fructose, honey, date syrup, high fructose corn syrup, malted barley, agave syrup, brown rice syrup, tapioca syrup, maple syrup, or any other suitable ingredient comprising reducing sugars may be selected for inclusion in the mixture, as they may provide higher levels of reducing sugars. Examples of ingredients that may form reducing sugars under heat treatment include ascorbic acid or derivatives thereof (e.g. sodium ascorbate, calcium ascorbate, or potassium ascorbate).

The following illustrate examples of ingredients and their associated compositions in a soymilk formula:

Example 1

| Ingredient | Approximate Range | Example Range |
| --- | --- | --- |
| Soybean extract comprising approximately 8-28% soy solids | 10-80% | 30-70% |
| Sodium ascorbate | 0-1% | 0.005-0.05% |
| Tricalcium phosphate | 0-1% | 0.1-0.5% |
| Evaporated cane juice | 0-12% | 0.1-6% |
| Carrageenan or gellan gum | 0-0.1% | 0.04-0.08% |
| Sodium chloride | 0-0.2% | 0.05-0.1% |
| Tripotassium citrate | 0-0.50% | 0.02-0.2% |
| Natural flavor | 0-0.50% | 0.01-0.1% |
| Water | q.s. 100% | Balance |

Example 2

| Ingredient | Approximate Range | Example Range |
| --- | --- | --- |
| Soybean extract comprising approximately 8-28% soy solids | 10-80% | 30-70% |
| Sodium ascorbate | 0-1% | 0.005-0.05% |
| Calcium carbonate | 0-1% | 0.1-0.6% |
| Evaporated cane juice | 0-12% | 0.1-6% |
| Carrageenan or gellan gum | 0-0.1% | 0.00-0.08% |
| Guar or locust bean gum | 0-0.50% | 0.00-0.25% |
| Xanthan gum | 0-0.1% | 0.01-0.05% |
| Sodium chloride | 0-0.2% | 0.05-0.1% |
| Tripotassium citrate | 0-0.50% | 0.02-0.2% |
| Natural flavor | 0-0.50% | 0.01-0.2% |
| Water | q.s. 100% | Balance |

Example 3

| Ingredient | Approximate Range | Example Range |
| --- | --- | --- |
| Soybean extract comprising approximately 8-28% soy solids | 10-80% | 30-70% |
| Sodium ascorbate | 0-1% | 0.005-0.05% |
| Calcium carbonate | 0-1% | 0.1-0.6% |
| Agave and/or brown rice syrup | 0-12% | 0.1-6% |
| Cocoa powder | 0-2% | 0.5-1.5% |
| Rebaudioside A (high intensity sweetener) | 0-0.05% | 0.001-0.006% |
| Carrageenan or gellan gum | 0-0.1% | 0.04-0.08% |
| Guar or locust bean gum | 0-0.50% | 0.00-0.25% |
| Xanthan gum | 0-0.1% | 0.00-0.05% |
| Sodium chloride | 0-0.2% | 0.05-0.1% |
| Tripotassium citrate | 0-0.50% | 0.02-0.2% |
| Natural flavor | 0 0.50% | 0.01-0.2% |
| Water | q.s. 100% | Balance |

Finally, at step 340, the mixture is processed to yield a soy-based food product. Processing may include pasteurization and/or homogenization. For example, processing may include UHT pasteurization. In certain embodiments, processing may include holding the soy mixture at a temperature that ranges from 175° F. to 195° F. for a period of 1 seconds to 20 seconds prior to pasteurization, which may enhance Maillard browning reactions to reduce hexanal levels in the soy product. In other embodiments, processing may include holding the soy mixture at a temperature that ranges from 285° F. to 300° F. for a period of 2 seconds to 6 seconds.

The steps illustrated in method 300 of FIG. 3 may be combined, modified, or omitted where appropriate, and additional steps may also be added to those shown. Additionally, the steps may be performed in any suitable order without departing from the scope of the present disclosure.

As one example, method 300 may be modified to yield a soy yogurt food product made from soybeans with high protein:oil ratios, rather than soymilk. In certain embodiments, for instance, soy extract according to method 300 may be cooled and diluted such that the mixture has approximately 4% to 6% protein. The cooled and diluted mixture may then be processed by UH-IT heating at approximately 284° F. for a period of approximately 4 seconds, and then cooled to approximately 110° F. Cultures may then be added to the mixture for fermentation to a pH between approximately 4.4 and 4.5.

The following illustrate examples of ingredients and their associated compositions in a soy yogurt formula:

Example 1

| Ingredient | Approximate Range | Example Range |
| --- | --- | --- |
| Soybean extract comprising approximately 8-28% soy solids | 50-95% | 70-90% |
| Water | 0-25% | 5-20% |
| Vitamins | 0-1% | 0.1-0.6% |
| Sodium Chloride | 0-1% | 0.01-0.03% |
| Dipotassium Phosphate | 0-1% | 0.03-0.10% |
| Citric Acid | 0-1% | 0.0-0.4% |
| Sugars | 0-10% | 0-3% |
| Starch | 0-5% | 0-2% |
| Calcium | 0-1% | 0.0-0.5% |

| Ingredient | Approximate Range | Example Range |
|---|---|---|
| Cultures | 0-1% | 0.01-0.04% |
| Fruit | 0-5% | 0-3% |

Soy yogurt according to the above formula may yield higher levels of acetylthizoline (approximately 2.48 ppb as compared to approximately 1.65 ppb in yogurt made from cow's milk as measured by headspace SPME GC-MS), which may cause higher levels of cereal taste characteristics. However, soy yogurt according to the above formula may achieve low combined hexanal and pentanal levels (e.g., less than 20 ppb or less than 10 ppb combined as measured by headspace SPME GC-MS), which may cause the soy yogurt to have little to no grassy taste characteristics.

Certain embodiments of the present disclosure may provide one or more advantages. For example, the systems and/or methods disclosed herein may provide for a soy extract with lower lipid oxidation and thus lower hexanal (and/or pentanal) levels. As a result, the resulting soy-based food product may have enhanced taste characteristics, such as lower levels of a grain/cereal taste characteristic. Alternatively, aspects of the present disclosure may allow for soy-based food products having similar taste characteristics but higher levels of protein than current soy-based food products, since the amount of soy extract used in creating the food product may be greater than that used in current soy-based food products. Furthermore, resulting soy-based food products made according to aspects of the present disclosure may not produce or may reduce levels of acetylthizoline and/or methional, which may contribute to grainy/cereal odors in the food product. Particular embodiments may provide some, none, or all of these operational benefits, and may provide additional operational benefits.

Although the present disclosure has been described with several embodiments, numerous changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method, comprising:
   adding a plurality of soybeans to an extractor, the soybeans having an average protein:oil ratio of greater than 2.3;
   heating the soybeans;
   removing hulls from the plurality of soybeans; and
   grinding the plurality of soybeans with water at a temperature between 180° F. and 190° F. to yield an aqueous soy extract having hexanal levels of less than 50 parts per billion (ppb).

2. The method of claim 1, wherein the plurality of soybeans comprises:
   a first set of soybeans having a protein:oil ratio of less than 2.3; and
   a second set of soybeans having a protein:oil ratio of greater than 2.5.

3. The method of claim 1, wherein the plurality of soybeans comprises:
   a first set of soybeans having a protein:oil ratio of less than 2.2; and
   a second set of soybeans having a protein:oil ratio of greater than 2.6.

4. The method of claim 1, wherein the soybeans have an average protein:oil ratio of greater than 2.4.

5. The method of claim 1, wherein the soybeans have an average protein:oil ratio of greater than 2.5.

6. The method of claim 1, wherein the soy extract has hexanal levels of less than 30 ppb.

7. The method of claim 1, further comprising extruding the de-hulled soybeans to remove oil.

8. The method of claim 1, further comprising:
   adding the soy extract to a mixer;
   adding ingredients to the mixer, the ingredients including at least one of the following: stabilizers, vitamins, minerals, flavors, functional ingredients, salts, antioxidants, or sugar; and
   mixing the ingredients, using the mixer, to yield a mixture having the soy extract and the ingredients dispersed substantially evenly throughout.

9. The method of claim 1, further comprising:
   mixing the soy extract and one or more ingredients to yield a mixture, wherein the one or more ingredients comprise at least one of calcium carbonate or ascorbic acid, and
   the method further comprises heating the mixture to a temperature in the range of 285° F. to 300° F. for a period of 2 seconds to 6 seconds.

10. The method of claim 8, further comprising pasteurizing the mixture.

* * * * *